United States Patent [19]
Siegel

[11] Patent Number: 6,026,187
[45] Date of Patent: Feb. 15, 2000

[54] SYSTEM FOR AUTOMATICALLY FILLING AN ORIGINAL FORM

[75] Inventor: Robert P. Siegel, Penfield, N.Y.

[73] Assignee: Xerox Corporation, Stamford, Conn.

[21] Appl. No.: 08/915,839

[22] Filed: Aug. 21, 1997

Related U.S. Application Data

[63] Continuation of application No. 08/345,044, Nov. 25, 1994, abandoned.

[51] Int. Cl.[7] .................................................. G06K 9/74
[52] U.S. Cl. ...................... 382/213; 345/113; 358/450; 707/507
[58] Field of Search .................... 345/112–116, 435; 358/448–450, 452–453; 382/175, 282–284, 100, 180, 213, 214, 287, 291, 294; 395/133, 135, 510, 766–769, 961, 964; 707/505–526

[56] References Cited

U.S. PATENT DOCUMENTS

| | | | |
|---|---|---|---|
| 4,542,378 | 9/1985 | Suganuma et al. | 340/734 |
| 4,620,808 | 11/1986 | Kurtin et al. | 400/83 |
| 4,933,979 | 6/1990 | Suzuki et al. | 382/61 |
| 5,001,769 | 3/1991 | Reid-Green et al. | 382/283 |
| 5,103,490 | 4/1992 | McMillin | 382/284 |
| 5,140,139 | 8/1992 | Shepard | 235/456 |
| 5,140,650 | 8/1992 | Casey et al. | 382/283 |
| 5,182,656 | 1/1993 | Chevion et al. | 358/452 |
| 5,235,654 | 8/1993 | Anderson et al. | 382/180 |
| 5,254,984 | 10/1993 | Wakeland | 345/144 |
| 5,299,305 | 3/1994 | Oomae et al. | 395/149 |
| 5,317,646 | 5/1994 | Sang, Jr. et al. | 382/9 |
| 5,353,393 | 10/1994 | Bennett et al. | 345/435 |
| 5,404,294 | 4/1995 | Karnik | 395/768 |
| 5,450,537 | 9/1995 | Hirai et al. | 395/149 |
| 5,490,243 | 2/1996 | Milman et al. | 395/148 |
| 5,495,565 | 2/1996 | Millard et al. | 395/147 |
| 5,500,932 | 3/1996 | Sasakura et al. | 395/149 |
| 5,517,644 | 5/1996 | Murdock | 395/650 |
| 5,659,459 | 8/1997 | Wakabayashi et al. | 361/753 |
| 5,737,740 | 4/1998 | Henderson et al. | 707/530 |
| 5,751,590 | 5/1998 | Cannon et al. | 364/479.03 |

OTHER PUBLICATIONS

Dayao et al., SuperForms, A Security–Enhanced Smart Electronic Form Management System, GLOBECOM '90, p. 1079–83, Dec. 1990.

Tech Illustrator Plus User's Reference, Revision A, Auto–trol Technology, p. 1–8, 5–20, 5–21, 5–22, 5–28, Feb. 1992.

*Primary Examiner*—Jon Chang
*Assistant Examiner*—Jayanti K. Patel
*Attorney, Agent, or Firm*—Tallam I. Nguti

[57] ABSTRACT

A printing system for automatically print-filling in an original form includes a scanner, a printer unit, an operator input unit, a display unit, a main processor and unit controllers. The original form is scanned to create a bitmap thereof that is stored in a first memory area as a first document including fill-in areas. A second blank document is created and stored in a second memory area. The first and second documents are displayed with the second document overlaying the first document. Required fill-in information is operator inputted onto the second document in areas thereof overlaying the fill-in areas in the first document. The original form is then loaded into the printer unit and the second document is selectively printed automatically onto the loaded original form.

8 Claims, 2 Drawing Sheets

SYSTEM FOR AUTOMATICALLY FILLING AN ORIGINAL FORM

This application is a continuation of application Ser. No. 08/345,044, filed Nov. 25, 1994, now abandoned.

BACKGROUND OF THE INVENTION

The present invention relates to imaging systems and methods, and more particularly to a method and system of automatically filling required information onto an original form.

There are in business and in the transactions of individual customers, situations in which it is required, or it is necessary, to use only the original preprinted form supplied to the business or customer, for providing machine printed required information. This typically means that handwritten entries of the required information are not acceptable, and that no copies or reproductions of the forms are acceptable, even when they include the required information in printed form. Such situations are common in for example hospitals involving medical records, in law firms involving court documents, and in numerous government operations involving licenses and certificates for example.

Conventionally, the typical solution for this situations has been to use a typewriter system as disclosed for example in U.S. Pat. No. 4,620,808 issued Nov. 4, 1986, to Kurtin et al. for print-filling in the original form as required. However, such a typical solution is apparently not very satisfactory, because it is tedious and time-consuming, as well as requiring careful and constant in-process positioning, viewing and manual realignment of the original form on the typewriter platen, as well as manually correcting any errors after typing. Additionally, most businesses and now home computer owners, already have invested significant capital in automatic, computer and word-processing systems, and understandably have a need, and would like such a system to be enabled to automatically print with acceptable quality and reliability on an original form as required in any of the above situations.

Some previously disclosed examples of approaches for using such a computer imaging system towards automation of some aspects of form filling are set forth below. One such approach is disclosed in an article by R. G. Casey and D. R. Ferguson in the IBM Systems Journal Vol. 29, No. 3, 1990 Pages 435–450 titled "Intelligent Forms Processing." Disclosed is a forms recognition process whereby the forms are scanned creating an electronic bitmap representation of the image. Using various image processing techniques, the bitmap form is analyzed and compared with other bitmap forms, stored in a database as templates, until a match is found. If no match is found, the user must enter the new type of form by interacting with the computer and specifying a new addition to the template database. The template creation process includes displaying the bitmap on a graphical display and using a pointing device to designate the outlines of fields.

Similar to the article by Casey and Ferguson, U.S. Pat. No. 4,933,979 to Suzuki et al. discloses a form sheet reading apparatus. In this system, a form is scanned resulting in an electronic bitmap which is displayed for a user on a graphic display terminal. The user, using a graphical input interface, then selects on the displayed bitmap the items which make up the template. For instance, the user may outline a box which has information answering a question posed on the form. The designations of the user are stored into a first file and is later used as a template. However, the process of template creation disclosed in Suzuki et al. is very manual intensive and prone to error. Also, Suzuki et al. requires that there be at least one line on the form in order to detect a field.

U.S. Pat. No. 5,254,984 issued Oct. 19,1993, to Wakeland discloses a VGA (video graphics array) controller for displaying images having selective components from multiple image planes. A first image and a second image overlaying the first image are interleaved into three of four bit planes of a dynamic random access memory. When displaying the image, the controller will simultaneously read from the first and second images. If the value of the second image is non-zero, then the second image is displayed. Otherwise the first image is displayed.

U.S. Pat. No. 4,542,378 issued Sep. 17, 1985, to Suganuma et al. discloses a document processing method wherein blank forms are read by an image input device, and the format thereof is stored in a memory. Additional information for filling in the form is input in the same manner, and the information is electronically overlaid using a control device for the memory, so that a completed form is stored in the memory for output by a printing device. With the invention, once the blank form is input to the device, further blank forms are unnecessary.

SUMMARY OF THE INVENTION

In accordance with one aspect of the present invention, there is provided a printing system for automatically print-filling in an original form having fill-in areas requiring fill-in information. The printing system includes a printer unit for holding and printing on the original form, a main processor including a CPU, multiple memory areas, image manipulation means, and control units for controlling peripherals. The printing system also includes an image input scanner for scanning a page of the original form to create an electronic image or bitmap thereof for storing in a first memory area as a first document including fill-in areas, means for creating a second document for storage in a second memory area, and a display unit for displaying the first and the second documents in superimposed relation, with the second document overlaying the first document. The printing system further includes an Input unit for inputting required fill-in information into the second document in areas thereof overlaying the fill-in areas included in the first document, and a printer control unit for selectively and automatically controlling the printer unit to print only the second document containing the required fill-in information onto the original that has been loaded into the printer unit for printing thereon.

In accordance with another aspect of the present invention, there is provided a method of print-filling-in an original form having fill-in areas requiring fill-in information. The method includes the steps of scanning the original form to create an electronic image or bitmap thereof, storing the created bitmap as a first document into a first memory area, overlaying the first document with a blank second document stored in a second memory area, and displaying on a display unit the first and the second documents with the second document overlaying the first. The method also includes inputting required fill-in information into areas in the second document overlaying fill-in areas in the overlayed first document, loading the original form into a printer unit of the printing system for printing thereon, and automatically printing only the second document containing the required fill-in information onto the loaded original form, thereby providing an automatically printed-filled-in original form.

Other features and characteristics of the present invention will become apparent from from the following drawings, description and claims.

BRIEF DESCRIPTION OF THE DRAWINGS

In the detailed description of the invention presented below, reference is made to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
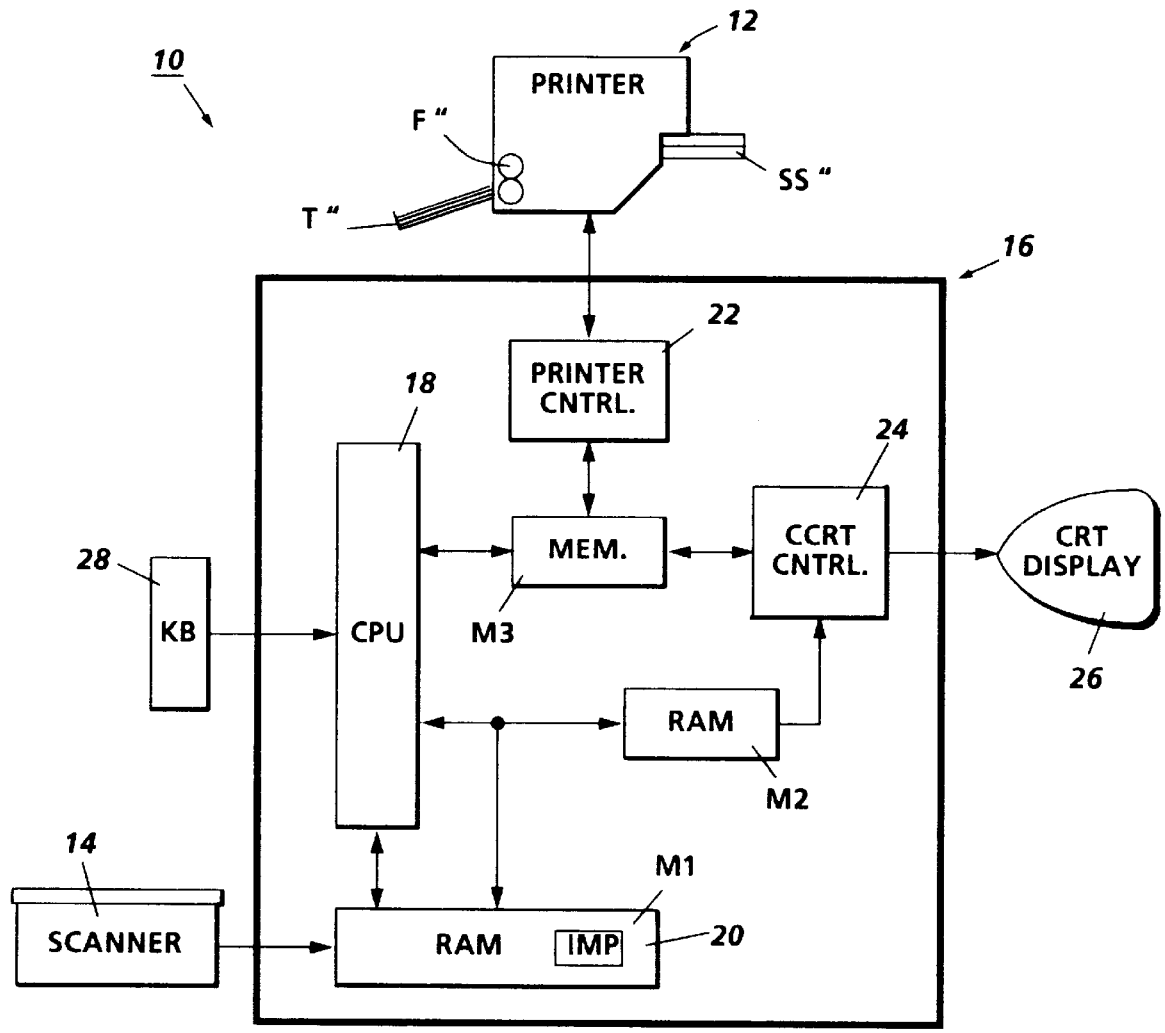
FIG. 1 is a block diagram showing the configuration of a typical imaging system incorporating the present invention.

Referring now to FIG. 1, an exemplary printing system 10 is illustrated, and according to the present invention, is suitable for automatically print-filling-in an original form that has fill-in areas requiring fill-in information. As shown, the printing system 10 includes a printer unit 12 for holding and printing on sheets including the original form for example. Printer unit 12 is a raster output device such as a laser printer, an ink jet printer or the like. As is well known, an ink jet printer includes a controlled printhead for emitting ink droplets on demand to create an ink image. On the other hand, a laser type printer includes a Raster Output Scanner (ROS) section (not shown), a Marking Section including a charged image bearing photoreceptive member (not shown), a development area (not shown), and a fusing area F", a Sheet Supply area SS" for holding and feeding copy sheets or forms to the Marking Section for printing thereon, and an output unit or tray T" for receiving the printed sheets or forms. The sheet supply area SS" of the printer unit 12 also is suitable for holding and feeding, in proper orientation and registration relative to the bitmap of first document D1, blank copy sheets, in addition to the original form.

The ROS section as is known, has a laser which produces imaging beams that are modulated in accordance with the signal content of an image to be printed. The modulated beams are scanned across the charged photoreceptive member to create a latent electrostatic image representation of the image to be printed. The latent electrostatic image is developed in the develop area, thus forming a toner image of the latent image. The toner image is then transferred at a transfer station to the original form or to a copy sheet that is supplied from the Sheet Supply area SS", according to the present invention. For such toner image transfer, the original form, previously loaded in proper orientation into the Sheet supply area SS", is brought forward in timed registration with the developed toner image on the photoreceptive member. The transferred toner image on the original form or on a copy sheet is next moved to the fusing area F" of the system where it is fused and permanently fixed, ready for discharge to the output unit or tray T".

The printing system 10 includes a digital raster input scanner (RIS) unit 14 that is connected to a main processor 16 for scanning a page of the original form at a time, including fill-in areas of the original form. The original form can thus be scanned by the digital scanner unit 14 under the supervision of a software program in the main processor 16. The main processor then stores all of the information contained in the original form into a first memory area or layer M1, for example a RAM (random access memory) or an NVM (non-volatile memory) area. As is well known, scanning with the digital scanner unit 14 will create an electronic image or bitmap of the original form which according to the present invention, is stored as a first document (including fill-in areas thereof) D1 in the first memory area M1 of the main processor 16.

As also shown, the printing system 10 includes the main processor 16 that is connected to and controls the printer unit 12, the scanner unit 14, and the other components of the printing system 10. Main processor 16, for example, includes a central processing unit or CPU 18, multiple memory areas Ml, M2, M3, image manipulation means 20 including an image manipulation program (IMP), and controllers for example, 22, 24 for controlling components of the printing system 10. If necessary, the main processor 16 for example will convert output image signals from the image input scanner unit 14 into digital image signals, and as is well known, then process these digital signals as required in order to enable storage and manipulation of the images created with respect to an original form according to the present invention. For example, the main processor 16 is provided with program means, including the image manipulation means IMP 20, for creating a second document D2 for storage in a second random access memory (RAM) area M2. The second document D2 preferably is a blank document having a size and bitmap coordinate system identical to those of the first document D1. The main processor 16 also includes means for merging the first and the second documents D1, D2 respectively, if desired, into a third document for storing in the third memory area M3.

The printing system 10 also includes a display unit 26 such as a user's computer monitor screen, that is connected to the main processor 16 and to the image manipulation means 20. The image manipulation means 20 include the image-on-image overlaying program IMP for displaying the first and the second documents D1, D2 respectively in a superimposed relation, with the second document D2 overlaying the first document D1. Image manipulation programs, for image layering are of course known as taught for example in U.S. Pat. No. 5,283,867. In addition, in CAD/CAM environments in which multiple aspects of a drawing (e.g. the piping aspect diagram and the wiring aspect diagram of a structure) are normally created separately, it is known to store such aspect diagrams in separate memories or layers, and then to display them superimposed one on the other in order to present an entire picture or any combination of the different aspects of the structure. According to the present invention therefore, the printing system 10 is capable of manipulating the first and the second documents D1, D2 as first and second screens of the display unit 26 respectively. The second screen is made blank and overlays the first screen in an aligned manner. Areas of the second screen not yet filled in with required fill-in information are transparent in relation to the underlying first screen, thus making the first screen visible through areas of the screen yet containing no information.

An operator input unit 28 such as computer keyboard, which together with the display unit 26 constitute an operator workstation, is also provided as part of the printing system 10. The input unit 28 as shown is connected to the main processor 16 and to said the display unit 26 for an operator manually inputting required fill-in information into the second document D2, and specifically into areas of D2 that are overlaying the fill-in areas of the first document D1. With the image of the unfilled original form displayed as D1 directly underneath the blank, but aligned, second document D2 on the user's computer screen 26, the user can then begin typing the required fill-in information onto D2 using keyboard 28. To the user it would appear as if D1 the original form is being filled-in electronically. Actually, the user is typing onto the second electronic document D2 which is stored separately from the underlying document D1. The net effect is much like placing a transparency on top of the original form and filling-in the required information onto the transparency in areas thereof directly over the fill-in areas of the original form. The original form itself however is not being written in during such writing onto the transparency.

As further shown, the main processor 16 includes a printer controller unit 22, and a display unit controller 24 for controlling the transfer and manipulation of image data at the display unit 26. The printer controller unit 22 is connected to the printer unit 12 for selectively and automatically controlling the printing of electronic documents stored or being processed by main processor 16. Having then stored the original form and the blank form as documents D1, D2 respectively on separate layers, it then becomes a straightforward task to print each document for example D2 on the original as called for in a situation of the present invention. To do so, the user simply places or loads the (hard copy) original form in a feed tray of the printer unit 12, and then activates a "fill-in-form" command under the control of controller 22. The main processor 16 and printer controller 22 then instruct the printer 12 to print selectively only the information filled-in on D2, onto the original form in the printer unit. Accordingly, the controller unit 22 selectively and automatically will control the printing of the second document D2, which contains only the required fill-in information, onto the original form. It should be noted that the (hard copy) original form being printed on can be the exact same form from which Document D1 was created by scanning, and which since then had been loaded into the printer unit 12 in the area SS" to be fed to receive a toner image of document D2 thereon in a manner as described above. The original form with the toner image thereon is then fed through the fusing area F" of the printer unit 12 in order to fuse and permanently affix the toner image onto the original form.

Figure 2:
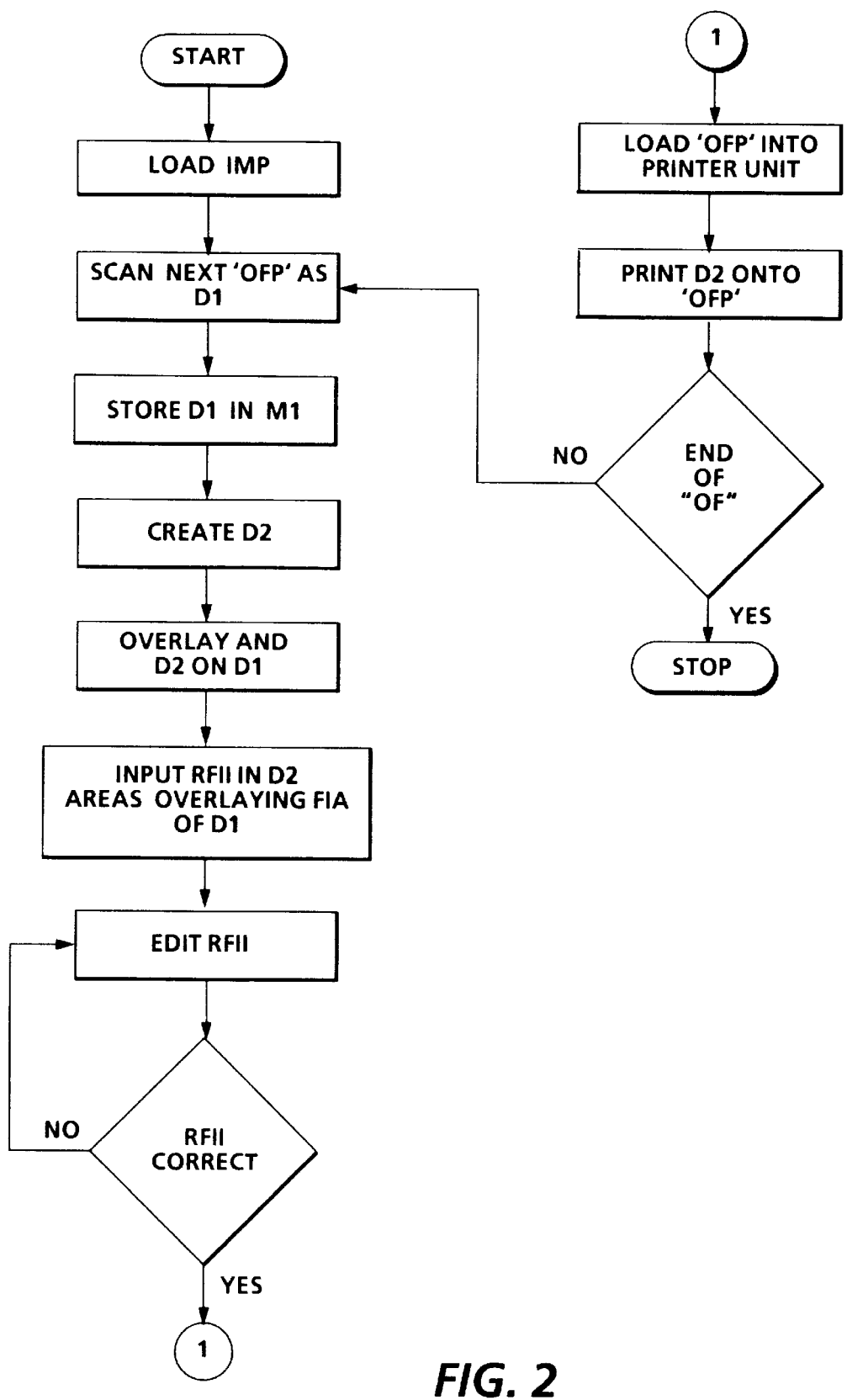
FIG. 2 is a flow diagram of the Original Forms Filling method of the present invention.

Referring now to FIG. 2, a method of print-filling in an original form that has fill-in areas requiring fill-in information is provided. As illustrated, IMP is an image manipulation software program as are well known; "OF" is the original form which may have more than one page; OFP is a page of the original form; RFII is the required fill-in information, and FIA refers to the fill-in areas of the original form and of first document D1. The method includes the step of scanning the original form using a scanning device 14 of a printing system to create a bitmap of the original form that includes fill-in areas FIA. The method also includes the steps of storing the created bitmap as a first document D1 into a first memory area M1, for example into a random access or non-volatile memory area, of the printing system, and of overlaying the first document with a created blank second document D2 stored in a second memory area M2. The second memory for example can also be a random access memory or (RAM). The method next includes the steps of displaying on a display unit 26 the first and the second documents D1, D2 in an overlayed relationship, such that the second document D2 is aligned over the first document D1, and of inputting required fill-in information RFII into areas in the second document D2 overlaying fill-in areas FIA in the overlayed first document D1. The required fill-in information RFII is then inputted using the workstation keyboard 28 of the printing system. The method then includes the steps of loading the original form "OF" into a printer unit SS" of the printing system for printing thereon, and of automatically printing only the second document D2 containing the required fill-in information RFII onto the loaded original form, one page at a time.

As is well known, in loading the original form care should be taken to ensure proper orientation of the required fill-in information when printed in the fill-in areas of the loaded original form. If necessary, copies of the original should be tested in various loading orientations in order to determine such proper orientation.

A variation of the method of the present invention may, following the inputting step, include a step of creating and storing a third document that is a merged combination of the second document and the first document. It is also possible of course to store the first and second documents D1, D2 respectively such that even without prior merging, both documents can be printed as a single document later. According to this variation, an ordinary blank copy sheet is then loaded into the printer unit of the printing system, and the merged or third document is automatically printed onto the loaded copy sheet. This variation is useful in business situations in which some users require filling-in only the original form, but others will receive filled-in copies of such original.

Having stored the form itself as a first document D1, different second documents D2, D2', D2" etc. related to different individuals can thus be created and printed on additional originals of the original form. In addition, each second document D2, D2', D2" etc. can also be saved for later reprinting each onto an original of the original form.

It is, therefore, apparent that there has been provided in accordance with the present invention, a printing system for automatically filling-in required information on an original form. As disclosed, the original form is scanned and stored as a first document D1. A second blank document D2 is created and overlayed in a superimposed manner, and in alignment over the first document D1. Required fill-in information is created onto the second document. The original form is loaded into a printer unit of the system, and the fill-in information on the second document D2 is automatically printed onto the original form in the fill-in areas thereof. Accordingly, the system described clearly obviates the need for using a typewriter in such situations, and replaces the typewriter with a scanner, a printer and software programs that manage images in two or more visible layers, and which can print one or more of while suppressing the other.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of print-filling in an original hardcopy form having preprinted areas and blank fill-in areas requiring fill-in information, the method comprising the steps of:

scanning the original hardcopy form to create a first electronic document including preprinted areas and blank fill-in areas;

(b) storing the first electronic document;

(c) creating a second electronic document that is blank, having nothing preprinted on it, and has a size and bitmap coordinate system identical to those of said first electronic document;

(d) displaying the first electronic document and the second electronic document simultaneously on a display apparatus, with the second electronic document overlaying the first electronic document;

(e) inputting required fill-in information into areas on the second electronic document overlaying the blank fill-in areas of the first electronic document; and (f) automatically and selectively printing the second electronic document containing only the required fill-in information as printing thereon onto the original hardcopy form, thereby providing an automatically filled-in original form.

2. The method of claim 1, wherein said storing step comprises storing the first electronic document into a first memory area of a printing system.

3. The method of claim 1, including a step of storing the blank second electronic document containing only the required fill-in information as printing thereon in a second memory area.

4. The method of claim 1, wherein the step of automatically and selectively printing the second electronic document is preceded by a step of loading the original form into a printer unit of a printing system for printing thereon.

5. The method of claim 4, wherein said loading step comprises loading the original form in a tested and proper orientation for correctly receiving the required fill-in information in the fill-in areas thereon.

6. A printing system for automatically print-filling in an original hardcopy form having preprinted areas and blank fill-in areas requiring fill-in information, the printing system comprising:

(a) a printer unit for holding and automatically printing onto the original hardcopy form;

(b) a main processor connected to said printer unit;

(c) an image input scanner connected to said main processor for scanning a page of the original hardcopy form including the preprinted areas and blank fill-in areas to create a first electronic document thereof;

(d) means for creating a second electronic document that is entirely blank, having nothing preprinted on it, for storage in said main processor, said second electronic document having a size and bitmap coordinate system identical to those of said first electronic document;

(e) a display unit connected to said main processor for displaying the first and the second electronic documents simultaneously in superimposed relation with the second document overlaying the first document;

(f) an input unit connected to said main processor and to said display unit for inputting required fill-in information into the second electronic document in areas thereof overlaying the fill-in areas included in the first electronic document; and (g) a printer control unit connected to said main processor and to said printer unit for selectively and automatically printing the second electronic document containing only the required fill-in information onto the original hardcopy form in said printer unit.

7. The printing system of claim 6, wherein said printer unit includes means for holding and feeding the original hardcopy form in proper orientation and registration relative to the first electronic document.

8. The printing system of claim 6, wherein said display unit and said printer control unit include means for manipulating said first and said second electronic documents as first and second screens respectively, said second screen overlaying said first screen.

* * * * *